W. M. FULTON.
VALVE.
APPLICATION FILED JULY 9, 1906.
907,771.
Patented Dec. 29, 1908.
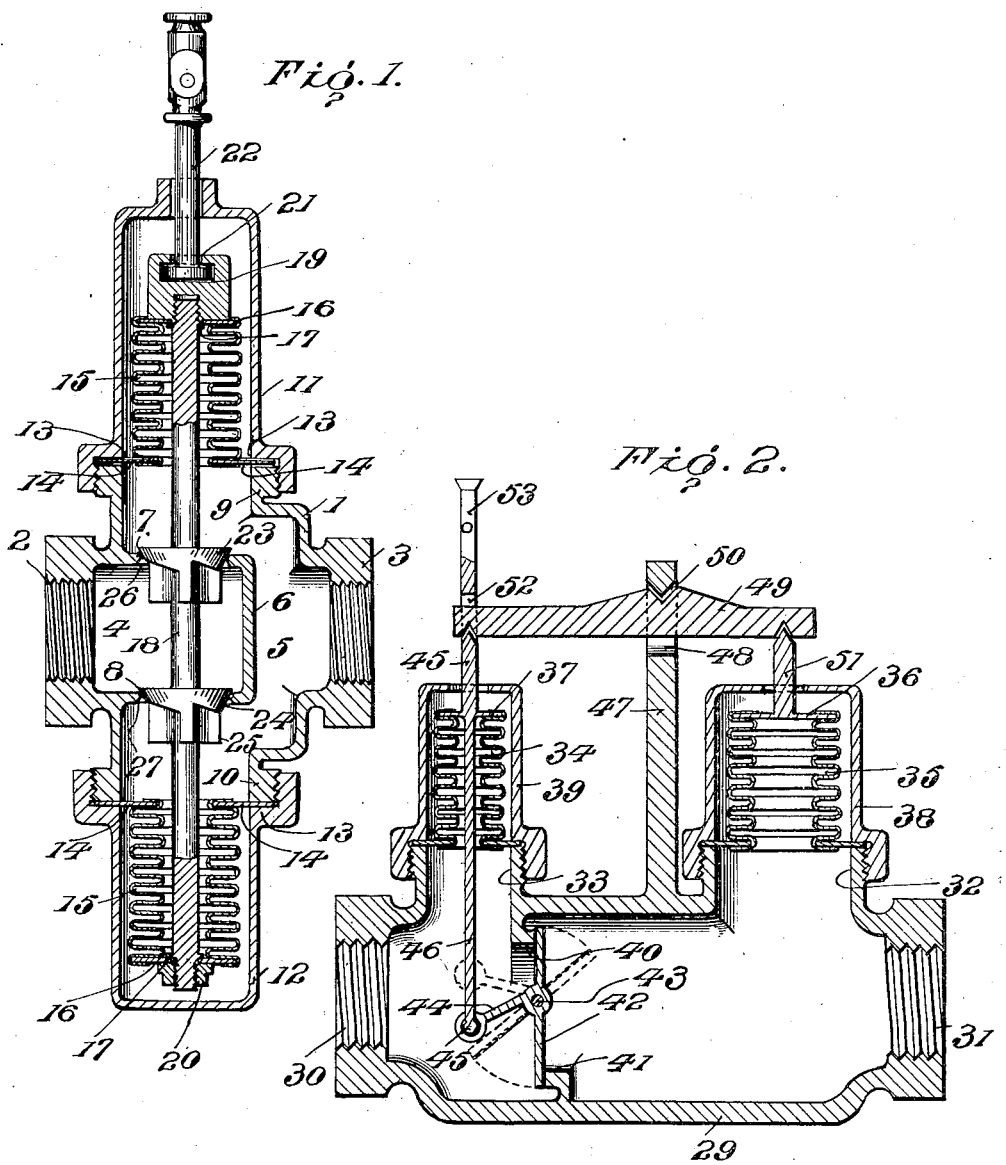

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

VALVE.

No. 907,771.    Specification of Letters Patent.    Patented Dec. 29, 1908

Application filed July 9, 1906. Serial No. 325,422.

*To all whom it may concern:*

Be it known that I, WESTON M. FULTON, of Knoxville, Tennessee, have invented a new and useful Improvement in Valves, which invention is fully set forth in the following specification.

This invention relates to valves, particularly to balanced valves for use in connection with automatic heat or pressure sensitive regulators, and has for its principal objects to secure great delicacy and uniformity of operation of the valve combined with durability in its construction; to eliminate in great measure the friction due to movement of the valve stem; to secure stability and steadiness in operation of the valve while subject to disturbances due to vorticular flow of fluid past the valve, and in short to provide a balanced valve which will offer a minimum and uniform resistance to the valve-controlling device.

Balanced valves as heretofore constructed lack delicacy in action and offer comparatively large and varied resistances to movement when operated by automatic regulators such as thermosensitive or pressure sensitive devices, thereby preventing the latter devices from properly maintaining the temperature or pressure for which such devices are set. It is therefore essential that the heat or pressure sensitive regulator should work against a uniform resistance in the valve, a condition which is not attained to a sufficient degree in the forms of valves now generally in use with such regulating devices. The valve stem working through its packing box offers a varied resistance to the sensitive regulator due in part to mechanical wear, to changes in temperature and deterioration of the packing material. This results in an unstable operation of the valve, enabling the automatic regulator to open and close it with ease at one time and with difficulty at another, thereby destroying the uniformity of regulation, one of the main objects sought. Fluctuations in the power necessary to be supplied by the regulator to move the valve stem also result from the vorticular movement of the fluid passing through the valve opening and about the valve cap, either to assist or retard the movement of the valve stem. A further cause in the irregular resistance offered to the movement of the valve stem results from variations of pressure of the fluid controlled by the valve even in the case of so-called balanced valves when the fluid pressure on the valve caps is supposed to be balanced. One of the reasons for this lies in the fact that the valve is not balanced in all positions of the valve caps, and that no proper provision is made for balancing the varying pressure on the end of the valve stem, which would detract from the accuracy of the automatic control. Valves which offer such varied resistance will be very unstable in operation when controlled by a delicate regulator, and will be subject to sudden opening and closing motions with every change in fluid pressure in the valve casing, thereby detracting from the accuracy of automatic control and resulting in unnecessary wearing of all working parts and limiting the life both of the valve and the regulator.

Heretofore in valves of the class referred to, it has been sought to balance the pressure on the end of the valve stem by making the area of one of the valve caps greater than its companion. While this arrangement provides for accurate balancing when the valve caps are seated, the balance or equilibrium is not, however, maintained when the caps are raised from their seating position. Owing to vorticular disturbances set up by the fluid passing the valve caps, which disturbances are not proportional to the areas of the valve caps but to their circumferences, vorticular action on the valve caps is consequently greater on one cap than the other, causing unstable operation of the valve and interfering with the delicate operation of the automatic regulator.

To overcome objections of the character above noted, and to attain the objects of this invention, I provide means for balancing fluid pressures on the valve caps and valve stem due both to static pressure and that resulting from the movement of the fluid or to its kinetic energy whereby the valve stem will offer a substantially uniform resistance to movement in all working positions.

Certain mechanical expressions of the inventive idea involved are shown in the accompanying drawings, which are designed merely as illustrations to assist in the description of the invention and not as defining the limits thereof.

In said drawings—Figure 1 is a vertical central sectional view showing one form of my invention; and Fig. 2 is a similar view illustrating another embodiment of the invention.

Referring to the drawings, and particularly to Fig. 1, the valve therein illustrated consists of a casing 1, having oppositely disposed threaded connections 2, 3, the former of which communicates with inlet space 4 and the latter with exit space 5, the two spaces 4, 5 being separated by a wall 6 in which are located in line with each other two valve seats 7 and 8. The valve casing 1 is also provided with exteriorly threaded tubular shoulders 9, 10, the openings being opposite the valve seats 7, 8. Engaging the threaded shoulders 9 and 10 are two caps 11 and 12 of identical construction, each having a ledge 13 which in association with shoulder 9, of the valve casing, receives and retains the annular flange plate 14 sealed to the inner end of the flexible wall 15, the opposite end of which is sealed to an inner projecting flange plate 16, resting against a shoulder 17 on the valve stem 18 and held firmly against the same by clamping nuts 19 and 20. Nut 19 is preferably provided with a socket for receiving a head 21 on the arm 22 which connects with a sensitive regulator not shown, and sensitive to heat or pressure, the operation of which imparts movement to the valve stem. Fast to the valve stem 18 are two valve caps 23, 24 provided with the usual guide flanges 25. The conical valve seats 7, 8 are of the same diameter and made on the same bevel and their bearing surfaces are reduced to a narrow band for receiving the cone-shaped valve caps 23, 24 by under-cutting the valve seats at points 26, 27. The surface contact of the valve caps 23, 24 and their valve seats 7 and 8 is thereby reduced to a narrow ledge, yet quite sufficient to give an accurate fit and make a fluid-tight closure. While retaining the conical seats, equilibrium of static pressures on the valve caps is practically secured, and disturbances from vorticular movement of the fluid passing around the lifted valve cap are also balanced.

The operation of the device as thus far described is as follows:—After assembling the parts of the valve, assume that they are in the position shown in Fig. 1, with the valve caps 23 and 24 seated, and the valve stem 22 coupled to an automatic heat or pressure-controlled regulator, not shown. Fluid under high pressure enters the space 4 and exerts equal and opposite pressures on valve caps 23 and 24 which expose substantially equal areas to the incoming fluid. The valve stem has therefore no tendency to move due to incoming fluid pressure. The fluid pressure on the faces of the valve caps exposed to pressure in space 5 are also in equilibrium for a like reason, and the pressures on the interior of the flexible walls connected to the valve stem are mutually opposed to each other, and being equal because of the equal surfaces of the walls exposed to fluid pressure in valve space 5, likewise have no tendency to move the valve stem. It is particularly to be noted that the ends of the valve stem are not exposed to the fluid pressure on either side of the valve caps, but are open to atmospheric pressure only, and therefore are not subject to that unstable operation arising when the two ends of the valve stem are subject to different and varying pressures. When the valve stem and with it the valve caps are lifted from their seats by the operation of the regulator, the equilibrium of pressures above referred to is not disturbed. The pressure of the incoming fluid on the faces of the valve caps remains constant, the vorticular disturbances due to movement of the fluid past each valve are neutralized because the two caps are of equal circumference, the pressure on the corrugated walls and the end closures remain equal and opposite and the ends of the valve stem are not acted on by the fluid in question. The valve offers uniform resistance to movement by the controlling device which operates within the valve or by vorticular disturbances produced by the fluid in passing through the valve whatever be the nature of the fluid.

While I prefer to give to my invention the mechanical expression above described, yet it may be embodied in other forms without departing from the spirit thereof. Whereas in Fig. 1 the collapsible walls 15, 15 are provided with outer end closures of equal area and the walls themselves are also similar in form and size, yet in certain constructions of valves the collapsible walls may be of different size as illustrated in the application of the principles of the invention to a hinged gate valve, Fig. 2.

The style of valve here shown is applicable to cases where the valve does not have to be fluid-tight when closed, for example, in the case of the circulation of hot water through pipes for heating purposes, where convectional action is the force which propels the circulation, and hence any obstruction thrown across the path of the circulating water is sufficient to stop the circulation even though the closure thus formed is not altogether water-tight. The valve consists of a hollow shell 29, having threaded openings 30, 31, in the opposite ends thereof, and threaded side openings 32, 33, which latter openings are closed by the flexible corrugated walls 34, 35, which have the rigid end walls 36, 37 therein, and which are connected to the main body of the valve by caps 38, 39, in the manner already described in Fig. 1. A semi-circular annular ledge 40 extends half way around the interior of shell 29, and another similar ledge 41, laterally removed from ledge 40 by an amount equal to the thickness of the hinged gate 42, extends around the remaining half of the interior surface of shell 29. Gate 42 is circular in form and is hinged on an axis 43 passing through its middle portion parallel to its surface, said axis 43 having bearings in the opposite sides of shell 29, so that, when in the position shown in Fig. 2, said gate is in contact with ledges 40, 41 around its periphery and thus obstructs the flow of fluid through the valve. An arm 44 attached to gate 42, has pivoted to its outer extremity 45 the rod 46 which extends downward from end wall 37. A stud 47 preferably integral with shell 29, extends upward and has a rectangular slot 48 in its upper extremity, through which slot passes the balance lever 49 fulcrumed on a knife-edge 50 which closes the upper end of slot 48. End wall 36 has an upward extension 51 provided with a knife-edge bearing against the end of lever 49. The extension 45 from end wall 37 has a slot 52 therein to receive one end of lever 49 and the lower end of slot 52 is closed by a knife-edge bearing for said lever. The automatic regulator may be connected to the valve at 53, as described above in relation to Fig. 1. As already stated, wall 36 may be of greater diameter than wall 37, and the position of stud 47 may be such that the end of lever 49, against which projection 51 bears, is just sufficiently shorter than the end against which projection 45 bears to compensate for the difference in pressure exerted on the opposite ends of lever 49 due to the unequal surface areas of end walls 36, 37. Since rod 46 forms a portion of end wall 37, the fluid pressure against the lower end of said rod is to be counted as a part of the pressure against end wall 37. Since it is practically impossible to make a valve of this type liquid-tight, the fluid pressure is always the same on both sides of gate 42, whether the valve be open or closed.

The operation of the valve will be readily understood from what has preceded. The valve by means of the flexible walls and lever offers a uniform resistance to the automatic regulator in all positions of the valve gate. In this construction of valve the pressure on unit surface is practically the same on opposite sides the valve-gate, and variations of pressure within the casing do not disturb the equilibrium established between the two flexible walls. Vorticular disturbances are absent in a valve of this character because the convectional circulation of the water is feeble and the valve is not intended to effect a fluid-tight closure.

What is claimed is:

1. In combination, a valve casing, oppositely disposed collapsible and expansible vessels opening into said casing and having end closures of substantially equal area exposed on one side to fluid pressure within the casing and on the other side to atmospheric pressure, two valve seats having reduced bearing surfaces, valves for seating thereon of equal cross-sectional area and having a connection with said end closures.

2. In combination, a valve casing, oppositely disposed expansible and collapsible vessels opening into said casing, said walls having end closures exposed on one side to equal and opposite fluid pressure within the casing and on the opposite side to atmospheric pressure, a valve provided with a valve stem connected to said end closures the ends of said valve stem being free from fluid pressure within the casing.

3. In a valve of the character described, the combination of a valve casing, collapsible and expansible vessels having flexible corrugated metal walls, means for connecting said vessels, each of which is exposed exteriorly to atmospheric pressure and interiorly to a fluid pressure tending to move said walls in opposition to each other, and a valve within said casing movable with said walls.

4. In a valve of the character described, the combination of a valve casing, a valve stem therein having inwardly and outwardly opening valves thereon of equal cross-sectional area and valve-seats therefor, oppositely disposed collapsible and expansible vessels each having one end stationary and the other end fast to said valve stem, the said vessels being exposed exteriorly to equal fluid pressures and opening interiorly into the valve casing for applying equal and opposite fluid pressures to the valve stem in all positions of the valves.

In testimony whereof I have signed this specification in the presence of two subscribing witnesses.

WESTON M. FULTON.

Witnesses:
E. T. MANNING,
ARTHUR SAVAGE.